United States Patent [19]

Yokomizo et al.

[11] 4,265,844

[45] May 5, 1981

[54] METHOD OF MANUFACTURING A VOLTAGE-NONLINEAR RESISTOR

[75] Inventors: Yuji Yokomizo; Kiyoshi Minami, both of Nagai, Japan

[73] Assignee: Marcon Electronics Co. Ltd., Nagai, Japan

[21] Appl. No.: 147,525

[22] Filed: May 7, 1980

[30] Foreign Application Priority Data

| | | | |
|---|---|---|---|
| May 16, 1979 | [JP] | Japan | 54-60682 |
| May 17, 1979 | [JP] | Japan | 54-61300 |
| Sep. 3, 1979 | [JP] | Japan | 54-113378 |
| Sep. 3, 1979 | [JP] | Japan | 54-113379 |
| Sep. 5, 1979 | [JP] | Japan | 54-114560 |

[51] Int. Cl.[3] .......... B28B 1/00; B29C 25/00

[52] U.S. Cl. .......... 264/61; 106/39.5; 252/512; 252/518; 252/519; 338/20

[58] Field of Search .......... 264/61, 63, 65, 82; 106/39.5, 512, 518, 519; 338/20; 427/34, 250, 423; 357/10; 252/512, 518, 519

[56] References Cited

U.S. PATENT DOCUMENTS

| | | | |
|---|---|---|---|
| 2,887,632 | 5/1959 | Dalton | 338/20 |
| 3,805,114 | 4/1974 | Matsuoka et al. | 252/518 |
| 3,903,226 | 9/1975 | Iga et al. | 252/518 |
| 3,905,006 | 9/1975 | Matsuoka et al. | 252/518 |
| 3,928,242 | 12/1975 | May | 252/518 |
| 3,950,274 | 4/1976 | May | 252/518 |
| 3,962,144 | 6/1976 | Matsuura et al. | 252/519 |
| 3,962,145 | 6/1976 | Matsuo et al. | 252/519 |
| 4,003,855 | 1/1977 | Wong | 252/519 |
| 4,015,230 | 3/1977 | Nitta et al. | 252/519 |
| 4,035,819 | 7/1977 | Nitta et al. | 264/61 |
| 4,052,340 | 10/1977 | Eijnthoven et al. | 252/518 |
| 4,060,661 | 11/1977 | Takami | 252/519 |
| 4,094,061 | 6/1978 | Gupta et al. | 264/61 |
| 4,127,511 | 11/1978 | Klein et al. | 252/519 |
| 4,132,619 | 1/1979 | Klein et al. | 252/519 |
| 4,142,996 | 3/1979 | Wong et al. | 252/519 |

FOREIGN PATENT DOCUMENTS

| | | | |
|---|---|---|---|
| 831691 | 9/1968 | Canada . | |
| 515198 | 11/1971 | Japan | 252/519 |
| 51-53298 | 5/1976 | Japan | 252/519 |
| 546022 | 3/1977 | U.S.S.R. | 252/519 |

*Primary Examiner*—W. E. Hoag
*Attorney, Agent, or Firm*—Oblon, Fisher, Spivak, McClelland & Maier

[57] ABSTRACT

A method of manufacturing a voltage-nonlinear resistor which has a substantially symmetrical voltage-current characteristic and a large voltage-nonlinearity coefficient and which is thus well resistant to surge voltage. The method comprises: preparing a ZnO-based composition containing metal zinc, at least one metal oxide such as bismuth oxide and at least one spinel type crystalline compound such as spinel type crystalline chromium compound, shaping the ZnO-based composition to form a body, and sintering the body of composition in the air at 1,000° C. or more.

8 Claims, 2 Drawing Figures

METHOD OF MANUFACTURING A VOLTAGE-NONLINEAR RESISTOR

BACKGROUND OF THE INVENTION

This invention relates to a method of manufacturing a voltage-nonlinear resistor, and more particularly a method wherein a ZnO (zinc oxide)-based starting composition containing a small amount of metal zinc is shaped and then sintered.

In recent years semiconductor elements and semiconductor circuits such as transistors, thyristors, and ICs have been rapidly improved. Their characteristics thus improved, the semiconductor elements and circuits are used in increasing numbers in measuring devices, control devices, communication devices and power supply devices. Provided with such semiconductor elements and semiconductor circuits, the devices are successfully miniaturized and come to have a high efficiency. On the other hand, however, these devices and their parts cannot be said to be sufficiently resistant against high voltage, surge voltage and noise. It is therefore demanded that these devices or their parts be protected against an abnormally high voltage or an abnormally large noise. That is, the circuit voltage of the devices or their part should be stabilized. Voltage-nonlinear resistors meet the demand. Thus it is required that there should be developed voltage-nonlinear resistors which has an excellent voltage-nonlinearity, a large discharge capacity, a long life, and a highly resistant characteristics against an abnormally high voltage or noise.

Hitherto, to stabilize the circuit voltage of measuring devices, control devices, communication devices and power supply devices, use has been made of voltage-nonlinear resistors such as SiC varistors and Si varistors. Zener diodes have been also used for the same purpose. Recently developed is a varistor made of a ZnO-based composition containing a few additives.

The voltage-current characteristic of a varistor is generally determined by the following formula:

$$I=(V/C)^{\alpha},$$

where V is the voltage across the varistor, I the current flowing through the varistor, C a constant, and $\alpha$ a nonlinearity coefficient. When $\alpha=1$, the varistor is an ordinary resistor covered by the Ohm's law. The larger is $\alpha$, the better voltage-nonlinearity. Generally, the varistor characteristic is determined by C and $\alpha$. Here, the varistor characteristic is expressed by $\alpha$ and a starting voltage $V_1$ mA at 1 mA.

Known SiC varistors are made by sintering SiC particles bonded together by a ceramic binder. The voltage-nonlinearity of the SiC varistors is determined by the dependancy of the contact resistance of SiC particles on the voltage applied to them. Thus, the value of C can be controlled by changing the thickness of the varistor, measured in the direction in which current flows through the varistor. But the nonlinearity coefficient of SiC varistors is relatively small, usually 3 to 7. Further, to manufacture an SiC varistor it is necessary to sinter an SiC mass in a non-oxidizing atmosphere.

Si varistors, whose voltage-nonlinearity owes to p-n junctions formed in an Si mass. The value of C cannot therefore be controlled over a broad range. Similarly, the voltage-nonlinearity of Zener diodes owes to p-n junctions formed in them. Despite their very good voltage-nonlinearity, Zener diodes cannot make resistor elements for a high voltage. They are disadvantageous also in that they are not sufficiently resistant against a surge voltage.

Other known voltage-nonlinear resistors are ceramic varistors made of a ZnO-based composition containing bismuth oxide, cobalt oxide, manganese oxide, antimony oxide and the like. These are rather varistors of new type. They exhibit an excellent voltage-nonlinearity which owes to the sintered masses of ZnO-based composition themselves. But the rate at which their $V_1$ mA varies in positive direction when a large impulse current flows through them much differs from the rate at which their $V_1$ mA varies in negative direction when a large impulse current flows through them. That is, ceramic varistors do not exhibit a symmetrical voltage-current characteristic. Thus they are not sufficiently stable and therefore not sufficiently reliable.

Other ceramic varistors are known which are made of a ZnO-based composition containing nickel oxide, barium oxide and the like or a ZnO-based composition containing rare earth element and cobalt oxide, but not containing bismuth oxide. Indeed these ceramic varistors exhibit a voltage-current characteristic less asymmetrical than that of the ceramic varistors made of a ZnO-based composition containing bismuth oxide among other additives. Further, their $V_1$ mA varies but very little. But they are less resistant against a surge voltage. In addition, they do not function for a sufficiently long time.

SUMMARY OF THE INVENTION

It is an object of this invention to provide a method of manufacturing a voltage-nonlinear resistor which exhibits a substantially symmetrical voltage-current characteristic and which is highly resistant against a surge voltage.

According to this invention there is provided a method of manufacturing a voltage-nonlinear resistor made of a sintered ZnO-based composition body which exhibits a voltage-nonlinearity. The method comprises steps of preparing a ZnO-based composition containing at least 0.001 to 20 mol% of metal zinc and at least one metal oxide selected from the group consisting of 1 mol% or less of bismuth oxide, 1 mol% or less of cobalt oxide and 1 mol% or less of manganese oxide; shaping the ZnO-based composition in the form of a plate or a rod; sintering the body of composition thus shaped at 1,000° C. or more in an oxidizing atmosphere; and forming electrodes on the body of composition thus sintered so as to be electrically connected to the sintered body.

Another method of manufacturing a similar resistor according to this invention comprises steps of preparing a ZnO-based composition containing at least 0.01 to 20 mol% of metal zinc, at least one metal oxide selected from the group consisting of 1 mol% or less of bismuth oxide, 1 mol% or less of cobalt oxide and 1 mol% or less of manganese oxide, and at least one spinel type crystalline compound selected from the group of 0.001 to 10 mol% of spinel type crystalline compound of antimony, 0.001 to 10 mol% of spinel type crystalline compound of titanium, 0.001 to 10 mol% of spinel type crystalline compound of chromium and 0.001 to 10 mol% of spinel type crystalline compound of tin; shaping the ZnO-based composition in the form of a plate or a rod; sintering the body of composition thus shaped at 1,000° C. or more in an oxidizing atmosphere; and forming electrodes on the body of composition thus sintered so as to be electrically connected to the sintered body.

DETAILED DESCRIPTION OF THE PREFERRED EMBODIMENTS

Now this invention will be described in detail with reference to several examples.

EXAMPLE 1

Three ZnO-based compositions were prepared. These compositions contained bismuth oxide, cobalt oxide, manganese oxide and metal zinc. But each contained these additives in a different mol percentage. Zinc oxide and the additives had been thoroughly mixed. Several discs having a diameter of 20 mm and a thickness of 0.5 mm were made of the first composition for providing resistors with $V_1$ mA of 100 V. Several discs having a diameter of 20 mm and a thickness of 1 mm were made of the second composition for providing resistors with $V_1$ mA of 200 V. Several discs having a diameter of 20 mm and a thickness of 1.5 mm were made of the third composition for providing resistors with $V_1$ mA of 300 V. All the discs were sintered in the air at 1,000° C. or more. The discs thus sintered were provided with electrodes, by Ag paint fusing, vapor deposition of silver or spraying of aluminum, whereby voltage-nonlinear resistors were manufactured.

Further manufactured were voltage-nonlinear resistors which were the same as those of Example 1, except that the starting compositions did not contain metal zinc. These resistors will hereinafter be called "Control 1". Also manufactured were voltage-nonlinear resistors which were the same as those of Example 1, except that the ZnO-based compositions contained only nickel oxide and barium oxide. These resistors will hereinafter be called "Control 2".

The sintering temperatures and compositions of Example 1 and Controls 1 and 2 were as shown in the following Table 1:

TABLE 1

| | $V_1$ mA 100V | | $V_1$ mA 200V | | $V_1$ mA 300 V | |
|---|---|---|---|---|---|---|
| | Sintering temp. 1,250° C. | | Sintering temp. 1,200° C. | | Sintering temp. 1,150° C. | |
| Example 1 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Zn | 3 mol % | Zn | 3 mol % | Zn | 1 mol % |
| | ZnO | 95.3 mol % | ZnO | 95.5 mol % | ZnO | 97.5 mol % |
| | Sintering temp. 1,250° C. | | Sintering temp. 1,200° C. | | Sintering temp. 1,150° C. | |
| Control 1 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol% |
| | MnO | 0.5 mol % | MnO | 0.5 mol % | MnO | 0.5 mol % |
| | ZnO | 98.3 mol % | ZnO | 98.5 mol % | ZnO | 98.5 mol % |
| | Sintering temp. 1,300° C. | | Sintering temp. 1,200° C. | | Sintering temp. 1,150° C. | |
| Control 2 | NiO | 1 mol % | NiO | 1 mol % | NiO | 1 mol % |
| | BaO | 1 mol % | BaO | 1 mol % | BaO | 1.5 mol % |
| | ZnO | 98 mol % | ZnO | 98 mol % | ZnO | 97.5 mol % |

Figure 1:
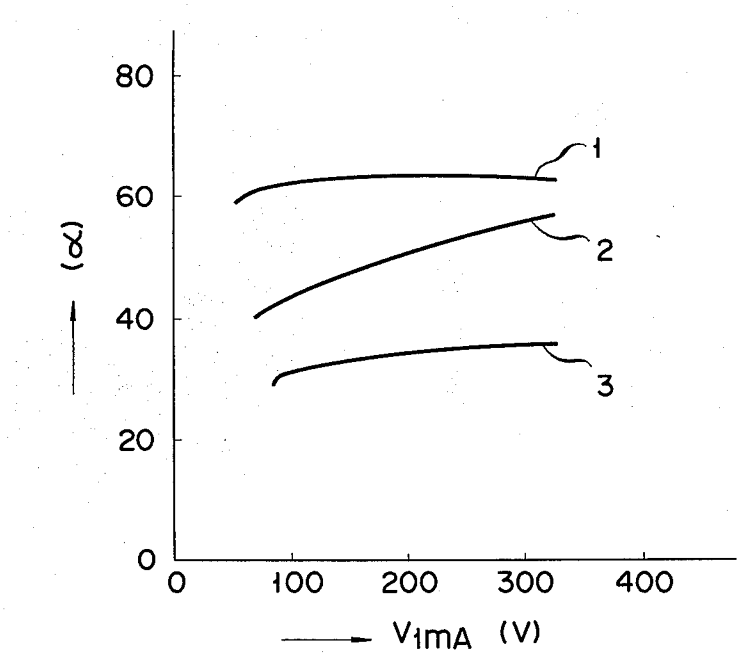
FIG. 1 is a graph showing the $V_1$ mA-$\alpha$ relationship of resistors according to this invention and the $V_1$ mA-$\alpha$ relationship of controls.

The sintered discs of Example 1 and Controls 1 and 2 exhibited a nonlinearity. That is, their $V_1$ mA varied in proportion to their thickness. However, Example 1, Control 1 and Control 2 showed different $V_1$ mA-$\alpha$ relationships as illustrated in FIG. 1. In FIG. 1, curve 1 indicates the $V_1$ mA-$\alpha$ relationship of Example 1, curve 2 that of Control 1 and curve 3 that of Control 3. As FIG. 1 clearly shows, the resistors of Example 1 had a nonlinearity coefficient greater than Control 1 and Control 2. Further, as curve 1 shows, the resistors of Examiner had a large nonlinearity coefficient $\alpha$ over a broad range of $V_1$ mA. This is a characteristic very important to a voltage nonlinear resistor.

The resistors of Example 1 and Control 1, whose $V_1$ mA was 200 V, were tested to ascertain their impulse current characteristic, their D.C. load characteristic and their temperature-humidity cycle characteristic. On the resistors a surge current of 500 A was applied 10,000 times, thus recording the impulse current characteristic, i.e. variation of $V_1$ mA in positive and negative directions. This test was conducted to see if the voltage-nonlinear resistors could work stably as surge voltage absorbing elements. Further, a load of 2 watts was applied on the resistors continuously for 500 hours at 85° C., thereby recording the D.C. load characteristic of the individual resistors, i.e. variation of $V_1$ mA in positive and negative directions. Moreover, the ambient temperature of these resistors was changed from −40° C. to 85° C. exactly 100 times, while applying a load of 2 watts on the resistors and maintaining the ambient humidity at 95%, thereby recording the temperature-humidity cycle characteristic of the individual resistors in terms of variation of $V_1$ mA in positive and negative directions. The results of these tests were as shown in the following Table 2.

TABLE 2

| | Control 1 | | Example 1 | |
|---|---|---|---|---|
| | Positive direction | Negative direction | Positive direction | Negative direction |
| Impulse current characteristic | +5% | −18% | +3% | +3% |
| D.C. load characteristic | +3% | −26% | +2% | +1.5% |
| Temp.-humidity cycle characteristic | +4% | −20% | +2% | +2% |

As Table 2 clearly shows, the resistors of Example 1 exhibited better impulse current, D.C. load and temperature-humidity characteristics than those of Control 1. Table 2 further shows that the resistors of Control 1, i.e. known voltage-nonlinear resistors, had their $V_1$ mA varied very much at a high temperature.

The resistors of Control 2, whose $V_1$ mA was 200 V, were put to the same tests. The results were that their $V_1$ mA varies more in negative direction than in positive direction by 4 to 5% in terms of variation of $V_1$ mA. In view of this, the resistors made of ZnO-based composition containing nickel oxide and barium oxide showed better impulse current, D.C. load and temperature-humidity cycle characteristics than those of Control 1, though their nonlinearity coefficient $\alpha$ was 35 at most as shown in FIG. 1.

The resistors of Example 1, i.e. voltage-nonlinear resistors according to this invention, had an excellent voltage-nonlinearity. What is more, they exhibited good impulse current, D.C. load and temperature-humidity cycle characteristics in positive and negative directions. That is, they had a symmetrical voltage-current characteristic. They can therefore function stably for a long time. This impart them a high reliability and a high practical value.

The ZnO-based composition, of which the resistors of Example 1 were made, contained bismuth oxide, cobalt oxide, manganese oxide and metal zinc. Of course, these oxide additives may be replaced by bismuth, cobalt and manganese so long as these metals are oxidized during the sintering process. The optimum sintering temperature may differ according to the amount of the additives contained in the ZnO-based composition. If the composition is sintered at less than 1,000° C., it would not be sintered sufficiently, and the sintered products would not exhibit so good characteristics as shown in Table 2. The highest sintering temperature may be raised so long as the sintered products do not expand or are not deformed.

Figure 2:
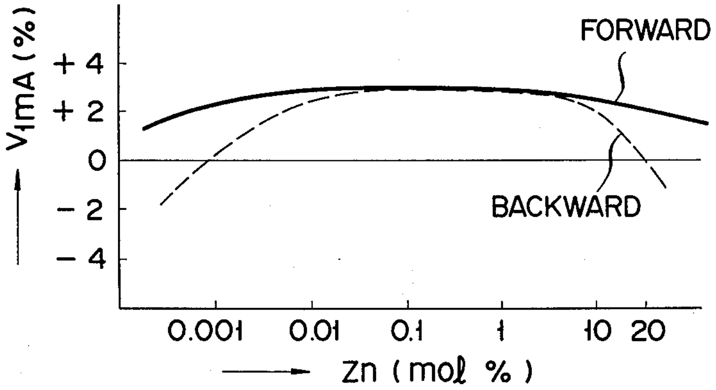
FIG. 2 is a graph showing the impulse current characteristic of resistors according to this invention.

A number of ZnO-based compositions were prepared, which contained metal zinc in different amounts, as well as bismuth oxide, cobalt oxide and manganese oxide in such amount as shown in Table 1. Using these compositions, a number of voltage-nonlinear resistors were manufactured. The resistors were tested, thereby recording their impulse current characteristic. The results were as shown in FIG. 2. As shown in FIG. 2, metal zinc should be contained in the ZnO-based composition in an amount of 0.001 mol% to 20 mol%. When it was contained in an amount outside this range, $V_1$ mA of the resultant products varied in negative direction to the same extent as did $V_1$ mA of Control 1. Preferably, metal zinc should be used in an amount of 0.01 mol% to 10 mol% in order to minimize the variation of $V_1$ mA, as clearly understood from FIG. 2.

The resistors of Example 1 were made of ZnO-based composition containing bismuth oxide, cobalt oxide, manganese oxide and metal zinc. They may contain other additives in a small amount. Such additives may be added to zinc oxide or be dispersed into the ZnO-based composition during the sintering process. Alternatively, a portion of them may be added to zinc oxide and the remaining portion may be dispersed into the ZnO-based composition during the sintering process.

EXAMPLE 2

Three ZnO-based compositions were prepared. Each of them contained 1 mol% or less of bismuth oxide, 1 mol% or less of cobalt oxide, 1 mol% or less of manganese oxide, 0.001 to 20 mol% of metal zinc and 0.001 to 10 mol% of a spinel type crystalline chromium compound. Zinc oxide and these additives had been thoroughly mixed. Several discs having a diameter of 20 mm and a thickness of 0.5 mm were made of the first composition for providing resistors with $V_1$ mA of 100 V. Several discs having a diameter of 20 mm and a thickness of 1 mm were made of the second composition for providing resistors with $V_1$ mA of 200 V. Similarly, several discs having a diameter of 20 mm and a thickness of 1.5 mm were made of the third composition for providing resistors with $V_1$ mA of 300 V. All these discs were sintered in the air at 1,000° C. or more. They were provided with electrodes in the same method as employed to manufacture the resistors of Example 1, whereby voltage-nonlinear resistors were manufactured.

Also manufactured were voltage-nonlinear resistors which were the same as those of Example 2, except that the starting compositions did not contain metal zinc. These resistors will hereinafter be called "Control 3".

The sintering temperatures and compositions of Example 2 and Control 3 were as shown in the following Table 3:

TABLE 3

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,150° C. | |
| Example 2 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Cr compound | 1 mol % | Spinel type crystalline Cr compound | 1 mol % | Spinel type crystalline Cr compound | 3 mol % |
| | Zn | 6 mol % | Zn | 2 mol % | Zn | 4 mol % |
| | ZnO | 91.3 mol % | ZnO | 95.5 mol % | ZnO | 91.5 mol % |
| | Sintering temp. 1,250° C. | | Sintering temp. 1,200° C. | | Sintering temp. 1,150° C. | |
| Control 3 | $Bi_2O_3$ | 0.7 mol % | $Bi_2O_3$ | 0.5 mol % | $Bi_2O_3$ | 0.5 mol % |

TABLE 3-continued

| $V_1$ mA 100V | | $V_1$ mA 200V | | $V_1$ mA 300V | |
|---|---|---|---|---|---|
| CoO | 0.5 mol % | CoO | 0.5 mol % | CoO | 0.5 mol % |
| MnO | 0.5 mol % | MnO | 0.5 mol % | MnO | 0.5 mol % |
| Spinel type crystalline Cr compound | 1 mol % | Spinel type crystalline Cr compound | 1 mol % | Spinel type crystalline Cr compound | 3 mol % |
| ZnO | 97.3 mol % | ZnO | 97.5 mol % | ZnO | 95.5 mol % |

The resistors of Example 2 exhibited $V_1$ mA-$\alpha$ relaionship which was substantially identified with curve 1 ;hown in FIG. 1. And the resistors of Control 3 showed $V_1$ mA-$\alpha$ relationship which was substantially identified vith curve 2 shown in FIG. 1.

The resistors of Example 2 and Control 3, whose $V_1$ nA was 200 V, were tested to ascertain their impulse :urrent, D.C. load and temperature-humidity cycle :haracteristics, exactly in the same way as those of :xample 1 and Controls 1 and 2 were tested. The results )f the test were as shown in the following Table 4:

TABLE 4

| | Control 3 | | Example 2 | |
|---|---|---|---|---|
| | Positive direction | Negative direction | Positive direction | Negative direction |
| mpulse :urrent :haracteristic | +4% | −15% | +3% | +3% |
| ).C. load :haracteristic | +3% | −21% | +2% | +2% |
| 'emp.-humidity :ycle :haracteristic | +4% | −16% | +2% | +1.5% |

A number of ZnO-based compositions were pre›ared, which contained metal zinc in different amounts, ıs well as bismuth oxide, cobalt oxide, manganese oxide ınd spinel type crystalline chromium compound in such ımounts as shown in Table 3. Using these compositions, ı number of voltage-nonlinear resistors were manufacured. The resistors were tested, and their impulse cur'ent characteristic was recorded. The results were subtantially the same as shown in FIG. 2. That is, they :xhibited substantially the same impulse current characeristic as that of Example 1. Thus, metal zinc should be :ontained in the ZnO-based composition in an amount )f 0.001 mol% to 20 mol%.

Figure 3:
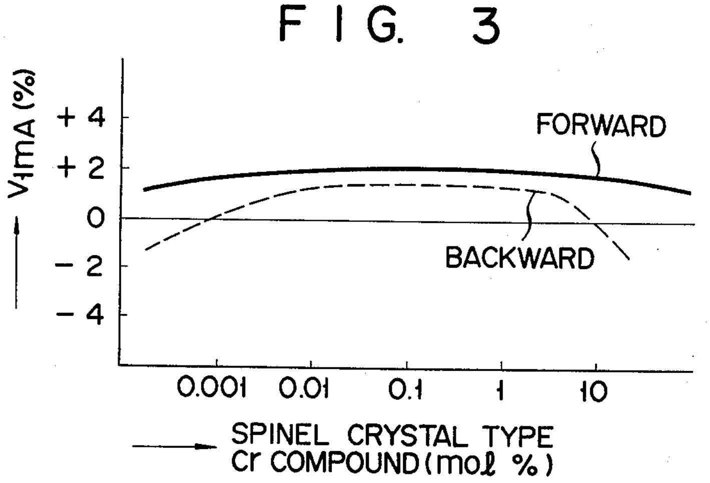
FIG. 3 is a graph showing the temperature-humidity cycle characteristic of resistors according to this invention.

Further, a number of ZnO-based compositions were ›repared, which contained spinel type crystalline chromium compound in different amounts, as well as bismuth oxide, cobalt oxide, manganese oxide and metal zinc in such amounts as shown in Table 3. Using these compositions, a number of voltage-nonlinear resistors of Example 2 were manufactured. The resistors were tested, and their temperature-humidity cycle characteristics were recorded. The results were as shown in FIG. 3. As FIG. 3, shows, spinel type crystalline chromium compound should be contained in the ZnO-based composition in an amount of 0.001 mol% to 10 mol%. When it was contained in an amount outside this range, $V_1$ mA of the resultant products varied in negative direction to such extent that their characteristics would be deteriorated. Preferably, spinel type crystalline chromium compound should be used in an amount of 0.01 mol% to 5 mol%.

EXAMPLE 3

Three ZnO-based compositions were prepared, which were identical with those used in Example 2 and shown in Table 3, except that they contained spinel type crystalline tin compound instead of spinel type crystalline chromium compound. Several resistors with $V_1$ mA of 100 V were made of the first composition, several resistors with $V_1$ mA of 200 V were made of the second composition, and several resistors with $V_1$ mA of 300 V were made of the third composition—all in the same method as those of Example 2.

Also manufactured were voltage-nonlinear resistors which were identical with those of Example 3, except that the starting compositions did not contain metal zinc. These resistors will hereinafter be called "Control 4".

The sintering temperature and compositions of Example 3 and control 4 were as shown in the following Table 5:

TABLE 5

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,150° C. | |
| Example 3 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline tin compound | 1 mol % | Spinel type crystalline tin compound | 2 mol % | Spinel type crystalline tin compound | 5 mol % |
| | Zn | 6 mol % | Zn | 4 mol % | Zn | 3 mol % |
| | ZnO | 91.3 mol % | ZnO | 92.5 mol % | ZnO | 90.5 mol % |
| | Sintering temp. 1,250° C. | | Sintering temp. 1,200° C. | | Sintering temp. 1,150° C. | |
| Control 4 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline tin compound | 1 mol % | Spinel type crystalline tin compound | 2 mol % | Spinel type crystalline tin compound | 5 mol % |
| | ZnO | 97.3 mol % | ZnO | 97.5 mol % | ZnO | 93.5 mol % |

The resistors of Example 3 and Control 4, whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 6:

TABLE 6

| | Control 4 | | Example 3 | |
|---|---|---|---|---|
| | Positive direction | Negative direction | Positive direction | Negative direction |
| Impulse current characteristic | +6% | −13% | +4% | +3.5% |
| D.C. load characteristic | +4% | −21% | +3% | +3% |
| Temp.-humidity cycle characteristic | +5% | −16% | +3% | +2.5% |

A number of ZnO-based compositions were prepared, which contained metal zinc in different amounts, as well as bismuth oxide, cobalt oxide, manganese oxide and spinel type crystalline tin compound in such amount as shown in Table 5. Using these compositions, a number of voltage-nonlinear resistors of Example 3 were manufactured. The resistors were tested, and their impulse current characteristics were recorded. The results were as shown in FIG. 4.

Also prepared a number of ZnO-based compositions which contained spinel type crystalline tin compound in different amounts, as well as bismuth oxide, cobalt oxide, manganese oxide and metal zinc in such amounts as shown in Table 5. Using these compositions, resistors of Example 3 were manufactured. The resistors were tested, and their temperature-humidity cycle characteristics were recorded. The results were as shown in FIG. 5.

Figure 4:
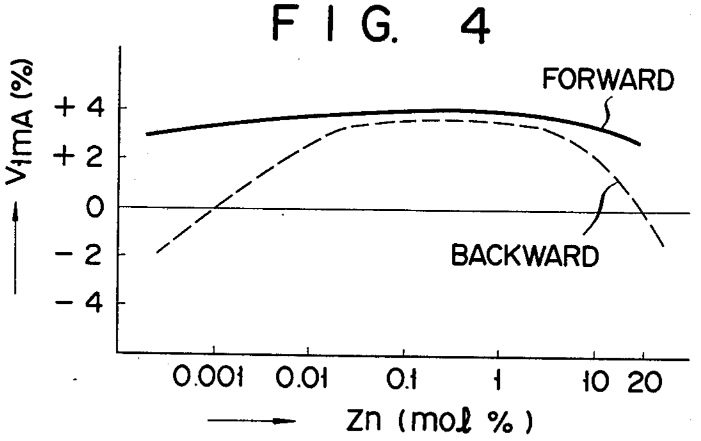
FIG. 4 is a graph illustrating the impulse current characteristic of other resistors according to this invention.
Figure 5:
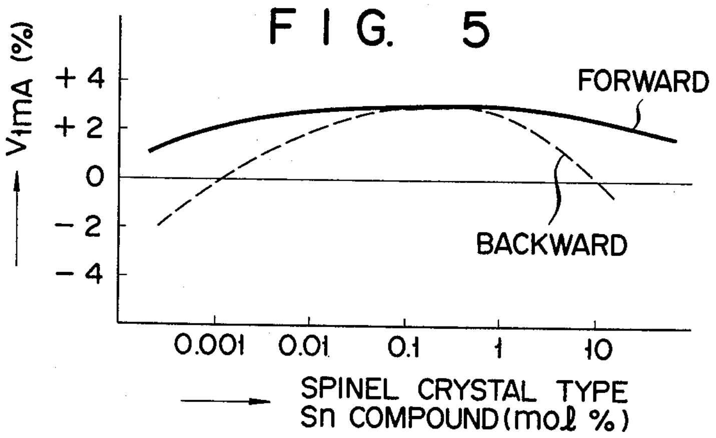
FIG. 5 is a graph showing the temperature-humidity cycle characteristic of other resistors according to this invention.

As Tables 5 and 6 and FIGS. 4 and 5 show, the resistors of Example 3 exhibited substantially the same characteristics as those of Examples 1 and 2.

EXAMPLE 4

Three ZnO-based compositions were prepared, which were identical with those used in Example 2 and shown in Table 3, except that they contained spinel type crystalline antimony compound instead of spinel type crystalline chromium compound. Several resistors with $V_1$ mA of 100 V were made of the first composition, several resistors with $V_1$ mA of 200 V were made of the second composition, and several resistors with $V_1$ mA of 300 V were made of the third composition—all in the same method as were those of Example 2.

Also manufactured were voltage-nonlinear resistors which were identical with those of Example 3, except that the starting compositions did not contain metal zinc. These resistors will hereinafter be called "Control 5".

The sintering temperature and compositions of Example 4 and Control 5 were as shown in the following Table 7:

TABLE 7

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,150° C. | |
| Example 4 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Sb compound | 1 mol % | Spinel type crystalline Sb compound | 1 mol % | Spinel type crystalline Sb compound | 4 mol % |
| | Zn | 6 mol % | Zn | 3 mol % | Zn | 3 mol % |
| | ZnO | 91.3 mol % | ZnO | 94.5 mol % | ZnO | 91.5 mol % |
| | Sintering temp. 1,250° C. | | Sintering temp. 1,200° C. | | Sintering temp. 1,150° C. | |
| Control 5 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Sb compound | 1 mol % | Spinel type crystalline Sb compound | 1 mol % | Spinel type crystalline Sb compound | 4 mol % |
| | ZnO | 97.3 mol % | ZnO | 97.5 mol % | ZnO | 94.5 mol % |

The resistors of Example 4 and Control 5 whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 8:

TABLE 8

| | Control 5 | | Example 4 | |
|---|---|---|---|---|
| | Positive direction | Negative direction | Positive direction | Negative direction |
| Impulse current characteristic | +6% | −10% | +4% | +4% |
| D.C. load characteristic | +5% | −20% | +3% | +2.5% |
| Temp.-humidity cycle characteristic | +5% | −15% | +3% | +3% |

A number of ZnO-based compositions were prepared, which contained metal zinc in different amounts, as well as bismuth oxide, cobalt oxide, manganese oxide and spinel type crystalline antimony compound in such amounts as shown in Table 7. Using these compositions, voltage-nonlinear resistors of Example 4 were manufactured. The resistors were tested, and their impulse current characteristics were recorded. The results were substantially the same as those illustrated in FIG. 4.

Further, a number of ZnO-based compositions were prepared, which contained spinel type crystalline antimony compound in different amounts, as well as bismuth oxide, cobalt oxide, manganese oxide and metal zinc in such amounts as shown in Table 7. Using these compositions, voltage-nonlinear resistors of Example 4 were manufactured. The resistors were tested, and their temperature-humidity cycle characteristics were recorded. The results were substantially the same as those illustrated in FIG. 5.

EXAMPLE 5

Three ZnO-based compositions were prepared, which were identical with those used in Example 2 and shown in Table 3, except that they contained spinel type crystalline titanium compound instead of spinel type crystalline chromium compound. Using these compositions, voltage-nonlinear resistors whose $V_1$ mA were 100 V, 200 V and 300 V were manufactured in the same method as were those of Example 2.

Also manufactured were voltage-nonlinear resistors which were identical with those of Example 5, except that the starting compositions did not contain metal zinc. These resistors will hereinafter called "Control 6".

The sintering temperature and compositions of Example 5 and Control 6 were as shown in the following Table 9:

A number of ZnO-based compositions were prepared, which contained metal zinc in different amounts, as well as bismuth oxide, cobalt oxide, manganese oxide and spinel type crystalline titanium compound in such amounts as shown in Table 9. Using these compositions, voltage-nonlinear resistors of Example 5 were manufactured. The resistors were tested, and their impulse current characteristics were recorded. The results were substantially the same as those illustrated in FIG. 4.

Further, a number of ZnO-based compositions were prepared, which contained spinel type crystalline titanium compound in different amounts, as well as bismuth oxide, cobalt oxide, manganese oxide and metal zinc in such amounts as shown in Table 9. Using these compositions, voltage-nonlinear resistors of Example 5 were manufactured. The resistors were tested, and their temperature-humidity cycle characteristics were recorded. The results were substantially the same as those illustrated in FIG. 5.

TABLE 9

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,150° C. | |
| Example 5 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Ti compound | 1 mol % | Spinel type crystalline Ti compound | 1 mol % | Spinel type crystalline Ti compound | 3 mol % |
| | Zn | 5 mol % | Zn | 2 mol % | Zn | 3 mol % |
| | ZnO | 92.3 mol % | ZnO | 95.5 mol % | ZnO | 92.5 mol % |
| | Sintering temp. 1,250° C. | | Sintering temp. 1,200° C. | | Sintering temp. 1,150° C. | |
| Control 6 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Ti compound | 1 mol % | Spinel type crystalline Ti compound | 1 mol % | Spinel type crystalline Ti compound | 3 mol % |
| | ZnO | 97.3 mol % | ZnO | 97.5 mol % | ZnO | 95.5 mol % |

The resistors of Example 5 and Control 6, whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 10:

TABLE 10

| | Control 6 | | Example 5 | |
|---|---|---|---|---|
| | Positive direction | Negative direction | Positive direction | Negative direction |
| Impulse current characteristic | +5% | −10% | +4% | +3.5% |
| D.C. load characteristic | +4% | −20% | +2% | +1.5% |
| Temp.-humidity cycle characteristic | +3% | −14% | +3% | +2.5% |

EXAMPLE 6

Three ZnO-based compositions were prepared, which were similar to those used in Example 2, except that they contained spinel type crystalline antimony compound in addition to spinel type crystalline chromium compound. Using these compositions, voltage-nonlinear resistors whose $V_1$ mA were 100 V, 200 V and 300 V were manufactured in the same method as were those of Example 2.

Also manufactured were voltage-nonlinear resistors which were identical with those of Example 6, except that the starting compositions did not contain metal zinc. These resistors will hereinafter be called "Control 7".

The sintering temperature and compositions of Example 6 and Control 7 were as shown in the following Table 11:

TABLE 11

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,200° C. | |
| Example 6 | $Bi_2O_3$ | 0.7 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type | | Spinel type | | Spinel type | |

TABLE 11-continued

| | $V_1$ mA 100V | | $V_1$ mA 200V | | $V_1$ mA 300V | |
|---|---|---|---|---|---|---|
| | crystalline | | crystalline | | crystalline | |
| | Sb compound | 0.5 mol % | Sb compound | 1.0 mol % | Sb compound | 2.0 mol % |
| | Spinel type crystalline | | Spinel type crystalline | | Spinel type crystalline | |
| | Cr compound | 0.5 mol % | Cr compound | 1.0 mol % | Cr compound | 1.0 mol % |
| | Zn | 2 mol % | Zn | 2 mol % | Zn | 6 mol % |
| | ZnO | 95.5 mol % | ZnO | 94.5 mol % | ZnO | 89.5 mol % |
| | Sintering temp. 1,250° C. | | Sintering temp. 1,200° C. | | Sintering temp. 1,200° C. | |
| Control 7 | $Bi_2O_3$ | 0.5 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline | | Spinel type crystalline | | Spinel type crystalline | |
| | Sb compound | 0.5 mol % | Sb compound | 1.0 mol % | Sb compound | 2.0 mol % |
| | Spinel type crystalline | | Spinel type crystalline | | Spinel type crystalline | |
| | Cr compound | 0.5 mol % | Cr compound | 1.0 mol % | Cr compound | 1.0 mol % |
| | ZnO | 97.5 mol % | ZnO | 96.5 mol % | ZnO | 95.5 mol % |

The resistors of Example 6 and Control 7, whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 12:

TABLE 12

| | Control 7 | | Example 6 | |
|---|---|---|---|---|
| | Positive direction | Negative direction | Positive direction | Negative direction |
| Impulse current characteristic | +6% | −10% | +4% | +4% |
| D.C. load characteristic | +4% | −20% | +3% | +2.5% |
| Temp.-humidity cycle characteristic | +5% | −14% | +3% | +3% |

A number of ZnO-based compositions were prepared, which contained metal zinc in different amounts, as well as bismuth oxide, cobalt oxide, manganese oxide and the two spinel type crystalline compounds in such amounts as shown in Table 11. Using these compositions, voltage-nonlinear resistors of Example 6 were manufactured. The resistors were tested, and their impulse current characteristics were recorded. The results were substantially the same as those illustrated in FIG. 4.

Further, a number of ZnO-based compositions were prepared, which contained the two spinel type crystalline compounds in different amounts, as well as bismuth oxide, cobalt oxide, manganese oxide and metal zinc in such amounts as shown in Table 11. Using these compositions, voltage-nonlinear resistors of Example 6 were manufactured. The resistors were tested, and their temperature-humidity cycle characteristics were recorded. The results were substantially the same as those illustrated in FIG. 5.

EXAMPLE 7

Three ZnO-based compositions were prepared, which were similar to those used in Example 3, except that they contained spinel type crystalline antimony compound in addition to spinel type crystalline tin compound. Using these compositions, voltage-nonlinear resistors whose $V_1$ mA were 100 V, 200 V and 300 V were manufactured in the same method as were those of Example 2.

Also manufactured were voltage-nonlinear resistors which were identical with those of Example 7, except that the starting compositions did not contain metal zinc. These resistors will hereinafter be called "Control 8".

The sintering temperature and compositions of Example 7 and Control 8 were as shown in the following Table 13.

TABLE 13

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,200° C. | |
| Example 7 | $Bi_2O_3$ | 0.5 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline | | Spinel type crystalline | | Spinel type crystalline | |
| | Sb compound | 0.5 mol % | Sb compound | 1.0 mol % | Sb compound | 1.0 mol % |
| | Spinel type crystalline | | Spinel type crystalline | | Spinel type crystalline | |
| | Sn compound | 0.5 mol % | Sn compound | 1.0 mol % | Sn compound | 2.0 mol % |
| | Zn | 2 mol % | Zn | 2 mol % | Zn | 6 mol % |
| | ZnO | 95.5 mol % | ZnO | 94.5 mol % | ZnO | 89.5 mol % |
| | Sintering temp. 1,250° C. | | Sintering temp. 1,200° C. | | Sintering temp. 1,200° C. | |
| Control 8 | $Bi_2O_3$ | 0.5 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |

TABLE 13-continued

| $V_1$ mA 100V | | $V_1$ mA 200V | | $V_1$ mA 300V | |
|---|---|---|---|---|---|
| Spinel type crystalline Sb compound | 0.5 mol % | Spinel type crystalline Sb compound | 1.0 mol % | Spinel type crystalline Sb compound | 1.0 mol % |
| Spinel type crystalline Sn compound | 0.5 mol % | Spinel type crystalline Sn compound | 1.0 mol % | Spinel type crystalline Sn compound | 2.0 mol % |
| ZnO | 97.5 mol % | ZnO | 96.5 mol % | ZnO | 95.5 mol % |

The resistors of Example 7 and Control 8, whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 14:

TABLE 14

| | Control 8 | | Example 7 | |
|---|---|---|---|---|
| | Positive direction | Negative direction | Positive direction | Negative direction |
| Impulse current characteristic | +6% | −10% | +4% | +3.5% |
| D.C. load characteristic | +5% | −20% | +3% | +2.5% |
| Temp.-humidity cycle characteristic | +5% | −15% | +3% | +3% |

A number of ZnO-based compositions were prepared, which contained metal zinc in different amounts, as well as bismuth oxide, cobalt oxide, manganese oxide and the two spinel type crystalline compounds in such amounts as shown in Table 13. Using these compositions, voltage-nonlinear resistors of Example 7 were manufactured. The resistors were tested, and their impulse current chracteristics were recorded. The results were substantially the same as those illustrated in FIG. 4.

Further, a number of ZnO-based compositions were prepared, which contained the two spinel type crystalline compounds in different amounts, as well as bismuth oxide, cobalt oxide, manganese oxide and metal zinc in such amounts as shown in Table 13. Using these compositions, voltage-nonlinear resistors of Example 7 were manufactured. The resistors were tested, and their temperature-humidity cycle characteristics were recorded. The results were substantially the same as those illustrated in FIG. 5.

EXAMPLE 8

Three ZnO-based compositions were prepared, which were similar to those used in Example 4, except that they contained spinel type crystalline chromium compound and spinel type crystalline titanium compound in addition to spinel type crystalline antimony compound. Using these compositions, voltage-nonlinear resistors whose $V_1$ mA were 100 V, 200 V and 300 V were manufactured in the same method as were those of Example 2.

Also manufactured were voltage-nonlinear resistors which were identical with those of Example 8, except that the starting compositions did not contain metal zinc. These resistors will hereinafter be called "Control 9".

The sintering temperature and compositions of Example 8 and Control 9 were as shown in the following Table 15:

TABLE 15

| | $V_1$ mA 100V | | $V_1$ mA 200V | | $V_1$ mA 300V | |
|---|---|---|---|---|---|---|
| | Sintering temp. 1,250° C. | | Sintering temp. 1,200° C. | | Sintering temp. 1,200° C. | |
| Example 8 | $Bi_2O_3$ | 0.5 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Sb compound | 0.5 mol % | Spinel type crystalline Sb compound | 1.0 mol % | Spinel type crystalline Sb compound | 2.0 mol % |
| | Spinel type Cr compound | 0.5 mol % | Spinel type Cr compound | 1.0 mol % | Spinel type Cr compound | 1.0 mol % |
| | Spinel type crystalline Ti compound | 0.5 mol % | Spinel type crystalline Ti compound | 1.0 mol % | Spinel type crystalline Ti compound | 1.0 mol % |
| | Zn | 2 mol % | Zn | 2 mol % | Zn | 6 mol % |
| | ZnO | 95.0 mol % | ZnO | 93.5 mol % | ZnO | 88.5 mol % |
| | Sintering temp. 1,250° C. | | Sintering temp. 1,200° C. | | Sintering temp. 1,200° C. | |
| Control 9 | $Bi_2O_3$ | 0.5 mol % | $Bi_2O_3$ | 0.5 mol % | $Bi_2O_3$ | 0.5 mol % |
| | CoO | 0.5 mol % | CoO | 0.5 mol % | CoO | 0.5 mol % |
| | MnO | 0.5 mol % | MnO | 0.5 mol % | MnO | 0.5 mol % |
| | Spinel type crystalline Sb compound | 0.5 mol % | Spinel type crystalline Sb compound | 1.0 mol % | Spinel type crystalline Sb compound | 2.0 mol % |
| | Spinel type crystalline Cr compound | 0.5 mol % | Spinel type crystalline Cr compound | 1.0 mol % | Spinel type crystalline Cr compound | 1.0 mol % |
| | Spinel type crystalline Ti compound | 0.5 mol % | Spinel type crystalline Ti compound | 1.0 mol % | Spinel type crystalline Ti compound | 1.0 mol % |

TABLE 15-continued

| V1 mA 100V | | V1 mA 200V | | V1 mA 300V | |
|---|---|---|---|---|---|
| ZnO | 97 mol % | ZnO | 95.5 mol % | ZnO | 94.5 mol % |

The resistors of Example 8 and Control 9, whose $V_1$ mA was 200 V, were tested to ascertain their impulse current, D.C. load and temperature-humidity cycle characteristics, exactly in the same way as those of Example 1 and Controls 1 and 2 were tested. The results of the test were as shown in the following Table 16:

TABLE 16

| | Control 9 | | Example 8 | |
|---|---|---|---|---|
| | Positive direction | Negative direction | Positive direction | Negative direction |
| Impulse current characteristic | +5% | −9% | +3.5% | +3.5% |
| D.C. load characteristic | +5% | −20% | +3% | +2.5% |
| Temp.-humidity cycle characteristic | +4% | −14% | +2.5% | +2.5% |

A number of ZnO-based compositions were prepared, which contained metal zinc in different amounts, as well as bismuth oxide, cobalt oxide, manganese oxide and the three spinel type crystalline compounds in such amounts as shown in Table 15. Using these compositions, voltage-nonlinear resistors of Example 8 were manufactured. The resistors were tested, and their impulse current characteristics were recorded. The results were substantially the same as those illustrated in FIG. 4.

Further, a number of ZnO-based compositions were prepared, which contained the three spinel type crystalline compounds in different amounts, as well as bismuth oxide, cobalt oxide, manganese oxide and metal zinc in such amounts as shown in Table 15. Using these compositions, voltage-nonlinear resistors of Example 8 were manufactured. The resistors were tested, and their temperature-humidity cycle characteristics were recorded. The results were substantially the same as those illustrated in FIG. 5.

Spinel type crystalline tin compound, for example, is prepared in the following way. First, zinc oxide, magnesium carbonate and tin oxide are mixed, each used in such an amount as to form spinel crystals together with the other ingredients. The mixture thus provided is heated at 1,300° C. for 6 hours. After this heat treatment, the mixture is subjected to wet grinding. Other spinel type crystalline compounds selectively used in Examples 2 to 8 are prepared in a similar method.

What we claim is:

1. A method of manufacturing a voltage-nonlinear resistor made of a sintered composition body which exhibits a voltage-nonlinearity, comprising:
   - preparing a ZnO-based composition containing zinc-oxide and at least 0.001 to 20 mol% of metal zinc and at least one metal oxide selected from the group consisting of 1 mol% or less of bismuth oxide, 1 mol% or less of cobalt oxide and 1 mol% or less of manganese oxide;
   - shaping the ZnO-based composition in the form of a plate or a rod;
   - sintering the body of composition thus shaped at 1,000° C. or more in an oxidizing atmosphere; and
   - forming electrodes on the body of composition thus sintered so as to be electrically connected to the sintered body.

2. A method according to claim 1, wherein metal zinc is contained in said composition in an amount of 0.01 to 10 mol%.

3. A method according to claim 1 or 2, wherein at least one of said metal oxides is contained in said composition in an amount of 0.7 mol% or less.

4. A method according to claim 1 or 2, wherein said body of composition is sintered in the air at 1,000° C. to 1,300° C.

5. A method according to claim 1 or 2, wherein said electrodes are formed on said sintered body of composition by metal vapor deposition, metal spraying process or conductive paint fusing process.

6. A method according to claim 1 or 2, wherein zinc oxide is used in said composition in an amount of 85 to 97.5 mol%.

7. A method of manufacturing a voltage-nonlinear resistor made of a sintered ZnO-based composition body which exhibits a voltage-nonlinearity, comprising:
   - preparing a composition containing zinc oxide and at least 0.001 to 20 mol% of metal zinc, at least one metal oxide selected from the group consisting of 1 mol% or less of bismuth oxide, 1 mol% or less of cobalt oxide and 1 mol% or less of manganese oxide, and at least one spinel type crystalline compound selected from 0.001 to 10 mol% of spinel type crystalline compound of antimony, 0.001 to 10 mol% of spinel type crystalline compound of titanium, 0.001 to 10 mol% of spinel type crystalline compound of chromium and 0.001 to 10 mol% of spinel type crystalline compound of tin;
   - shaping the ZnO-based composition in the form of a plate or a rod;
   - sintering the body of composition thus shaped at 1,000° C. or more in an oxidizing atmosphere; and
   - forming electrodes on the body of composition thus sintered so as to be electrically connected to the sintered body.

8. A method according to claim 7, wherein the total amount of spinel type crystalline compound contained in said composition is 0.01 to 5 mol%.

* * * * *